(12) United States Patent
Gutin et al.

(10) Patent No.: US 8,743,373 B1
(45) Date of Patent: *Jun. 3, 2014

(54) METROLOGY OF OPTICS WITH HIGH ABERRATIONS

(75) Inventors: Mikhail Gutin, Albany, NY (US);
Xu-Ming Wang, Albany, NY (US)

(73) Assignee: Applied Science Innovations, Inc., Troy, NY (US)

( * ) Notice: Subject to any disclaimer, the term of this patent is extended or adjusted under 35 U.S.C. 154(b) by 313 days.

This patent is subject to a terminal disclaimer.

(21) Appl. No.: 13/225,467

(22) Filed: Sep. 4, 2011

Related U.S. Application Data (63) Continuation-in-part of application No. 12/472,362, filed on May 26, 2009, now Pat. No. 8,018,602, which is a continuation-in-part of application No. 11/622,152, filed on Jan. 11, 2007, now Pat. No. 7,545,511.

(60) Provisional application No. 60/758,649, filed on Jan. 13, 2006.

(51) Int. Cl.
*G01B 11/02* (2006.01)

(52) U.S. Cl.
USPC .......................................... 356/512

(58) Field of Classification Search
USPC ........................................ 356/510–513, 515
See application file for complete search history.

(56) References Cited

U.S. PATENT DOCUMENTS

| | | |
|---|---|---|
| 5,625,454 A | 4/1997 | Huang et al. |
| 5,768,150 A | 6/1998 | Sonoda et al. |
| 5,815,268 A | 9/1998 | LaFleur |
| 6,008,904 A | 12/1999 | Ishii et al. |
| 6,195,168 B1 | 2/2001 | De Lega et al. |
| 6,456,382 B2 | 9/2002 | Ichihara et al. |
| 6,480,284 B1 | 11/2002 | Stenton |
| 6,624,895 B1 | 9/2003 | Moriyasu et al. |

(Continued)

FOREIGN PATENT DOCUMENTS

WO   WO2006091415 A2   8/2006

OTHER PUBLICATIONS

Scott A. Lerner. Jose M. Sasian, John E. Greivenkamp, Robed O. Gappinger, Steve R. Clark, Interferometric Metrology of Conformal Domes, Apr. 1999 SPIE vol. 3705, pp. 221-226, 1999.

(Continued)

*Primary Examiner* — Gregory J Toatley
*Assistant Examiner* — Maurice Smith
(74) *Attorney, Agent, or Firm* — Jay R. Yablon (57) ABSTRACT

An interferometry method and associated system and computerized media for testing samples under test including those with high aberrations, comprising: situating a sample under test between a tilt mirror and a reference mirror, the tilt mirror tiltable with at least one degree of freedom about at least one tilt mirror axis, and further translatable along an axial line defined by a direction of propagation of a test wavefront from a source thereof; propagating the test wavefront toward the tilt mirror; after the test wavefront has been reflected by the tilt mirror, further propagating the test wavefront toward a reference mirror; and deriving a substantially complete first-tilt-alignment wavefront metrology of the sample under test from a plurality of first-tilt-alignment interferograms taken with the tilt mirror held fixed at a first predetermined tilt mirror angle while discreetly varying a displacement between the sample under test and the reference mirror.

63 Claims, 7 Drawing Sheets

(56) References Cited

U.S. PATENT DOCUMENTS

| | | |
|---|---|---|
| 6,714,307 B2 | 3/2004 | DeGroot et al. |
| 6,714,308 B2 | 3/2004 | Evans et al. |
| 6,717,679 B2 | 4/2004 | Kuchel |
| 6,771,375 B2 | 8/2004 | Zanoni |
| 6,781,700 B2 | 8/2004 | Kuchel |
| 6,785,006 B2 | 8/2004 | Nishida |
| 6,801,323 B2 | 10/2004 | Evans |
| 6,842,255 B2 | 1/2005 | Ohsaki et al. |
| 6,879,402 B2 | 4/2005 | Kuchel |
| 6,894,788 B2 | 5/2005 | Deck |
| 6,912,055 B2 | 6/2005 | Ueki et al. |
| 6,956,657 B2 | 10/2005 | Golini et al. |
| 6,963,408 B2 | 11/2005 | Ishii et al. |
| 6,965,435 B2 | 11/2005 | Ina |
| 6,967,724 B2 | 11/2005 | Nishida |
| 6,972,849 B2 | 12/2005 | Kuchel |
| 6,972,850 B2 | 12/2005 | Ohtsuka et al. |
| 6,987,570 B1 | 1/2006 | Schmit et al. |
| 6,999,182 B2 | 2/2006 | Thibault |
| 7,012,700 B2 | 3/2006 | DeGroot et al. |
| 7,030,996 B2 | 4/2006 | DeGroot et al. |
| 7,072,042 B2 | 7/2006 | Kim et al. |
| 7,106,454 B2 | 9/2006 | De Groot et al. |
| 7,123,365 B1 | 10/2006 | Schulte |
| 7,126,698 B2 | 10/2006 | De Groot et al. |
| 7,375,824 B2 | 5/2008 | Kuhn et al. |
| 7,443,516 B2 * | 10/2008 | Takahashi et al. ............ 356/515 |
| 7,545,511 B1 | 6/2009 | Gutin |
| 8,018,602 B1 | 9/2011 | Gutin |
| 8,274,661 B2 * | 9/2012 | Hasegawa ..................... 356/511 |
| 2002/0012124 A1 | 1/2002 | Nakayama |
| 2002/0118370 A1 | 8/2002 | Nishida |
| 2003/0002048 A1 | 1/2003 | Zanoni |
| 2003/0002049 A1 | 1/2003 | Kuchel |
| 2003/0011784 A1 | 1/2003 | De Groot et al. |
| 2003/0043385 A1 | 3/2003 | Kuchel |
| 2003/0048457 A1 | 3/2003 | Evans et al. |
| 2003/0103215 A1 | 6/2003 | Kuchel |
| 2003/0169430 A1 | 9/2003 | Ohtsuka et al. |
| 2003/0184762 A1 | 10/2003 | Kim et al. |
| 2003/0184763 A1 | 10/2003 | Ueki et al. |
| 2004/0239947 A1 | 12/2004 | De Groot et al. |
| 2004/0257584 A1 | 12/2004 | Nishida |
| 2005/0134863 A1 | 6/2005 | De Lega et al. |
| 2005/0157311 A1 | 7/2005 | Kuchel |
| 2006/0256347 A1 | 11/2006 | Lindner |
| 2006/0268282 A1 | 11/2006 | Evans et al. |

OTHER PUBLICATIONS

J. Fleig, P. Dumas, P. E. Murphy, G. W. Forbes, An automated subaperture stitching interferometer workstation for spherical and aspherical surfaces, Proc. SPIE vol. 5188, 2003.

P. E. Murphy, J. Fleig, G. Forbes, M. Tricard, High precision metrology of domes and aspheric optics, Proc. SPIE vol. 5786, 2005.

Christopher Hall, Justin Tracy, and Christopher Supranowitz, Recent advances in finishing and measuring windows and domes, Proceedings of the 13th DoD Electromagnetic Windows Symposium, May 17-20, 2010.

R.E. Parks, C. Evans, L. Shao, Calibration of Interferometer Transmission Spheres. OSA, OF&T, Hawaii, 1999 or P. Zhou, J.H. Burge. Limits for Interferometer Calibration Using the Random Ball Test. SPIE 7426, 7426U-1, 2009.

* cited by examiner

METROLOGY OF OPTICS WITH HIGH ABERRATIONS

CROSS REFERENCE TO RELATED APPLICATIONS

This application is a continuation-in-part of pending application U.S. Ser. No. 12/472,362 filed May 26, 2009, now U.S. Pat. No. 8,018,602 issued Sep. 13, 2011. Said U.S. Ser. No. 12/472,362 is a continuation-in-part of U.S. application Ser. No. 11/622,152 filed Jan. 11, 2007, now U.S. Pat. No. 7,545,511 issued Jun. 9, 2009, which in turn claims benefit of U.S. provisional application 60/758,649 filed Jan. 13, 2006. All of the foregoing are hereby incorporated by reference in their entirety.

STATEMENT REGARDING FEDERALLY SPONSORED RESEARCH OR DEVELOPMENT

This invention was supported, in whole or in part, by contracts N68936-10-C-0139, N68936-09-C-0068, and N68936-08-C-0056 from the United States NAVY, and W31P4Q-07-C-0074 from the United States Army. The Government has certain rights in the invention.

BACKGROUND OF THE INVENTION

Traditional optical metrology is intended for measurement of optics with low aberrations. Attempts to adapt traditional metrology to measurement of highly aberrated wavefronts and surfaces meet several limitations. Conventional metrology with plane or spherical reference produces fringe patterns with high spatial frequencies, which cannot be resolved by the interferometer imaging sensor. Aspheric null mirrors pose the problem of fabrication, testing the null itself, and alignment.

It would instead be desirable to use one simple shape of the reference optics for all shapes of highly aberrated optics to be tested, allow for relaxed tolerances on the reference, have low requirements to the resolution of the imaging sensor, and feature easy fabrication, testing, and alignment of all components of the metrology system and method.

The invention disclosed herein will serve as an attachment to a standard interferometer. It is planned for use by optical fabrication facilities in production of optics, both aspheric and spherical, and highly aberrated optics in general. The hardware of this invention will be compatible with standard commercial interferometers already in use by fabrication facilities. The metrology according to this invention will further use standard procedures from the operator standpoint, to reduce "psychological threshold" for its application in existing manufacturing processes. One of the distinctive features of the invention is the low cost.

The system and method according to this invention are uniquely beneficial for testing existing and emerging optics designed with high aberrations. It will find applications to new types of highly aberrated, aspheric optics. For example, as precision single-point diamond turning continues to grow popular and moldable infrared glasses enable new types of optical systems, surface shapes previously considered exotic are becoming mainstream. Compound lenses will continue to emerge with aspheric components that have intentionally high aberrations prior to assembly. While testing the assembled lens is possible with traditional interferometers, the metrology according to this invention, performed on individual components, may enable otherwise impossible tests at earlier fabrication stages, to improve quality, increase productivity, and reduce cost. The ability of this invention to measure highly aberrated optics will enable new optical designs which are presently difficult to implement and impossible to test.

Many interferometers are commercially available, applicable to measurement of wavefronts and optical figures of optical components. Common to all methods of interferometry are the following requirements: 1) the setup must get light back into the interferometer; 2) the sensor must be able to resolve the fringes; and 3) the optical test setup must be precisely defined for calculation of the wavefront.

Transparent domes introduce significant aberrations into transmitted wavefronts. With the exception of a spherical dome illuminated by a spherical wavefront concentric with the dome, wavefront aberrations are always present and significant, especially in deep concave shapes typical of aerodynamically conformal domes. For example, the corrector optics inside a missile dome is designed to compensate these aberrations. The compensation typically varies with the look angle of the gimbaled corrector optics inside the dome. Therefore, unlike production and testing of low-aberration optics, the task of fabricating and testing aspheric domes and associated corrector optics is to make and test optics "highly aberrated by design." Traditional interferometry is not directly applicable to this task; it serves to measure small amounts of aberrations. At large aberrations, the spatial frequency of the fringe pattern exceeds the Nyquist limit, so that the pattern is undersampled by the imaging sensor. This causes either complete failure of the measurement or loss of confidence in the result, e.g., due to assumptions about the wavefront shape made in sub-Nyquist sampling, such as described by Lerner et al (Scott A. Lerner. Jose M. Sasian. John E. Greivenkamp Robert 0. Gappinger. Steve R. Clark. Interferometric Metrology of Conformal Domes. April 1999 SPIE Vol. 3705, pp. 221-226, 1999). The same paper analyzed several layouts of interferometric transmitted wavefront testing. Of the multiple options considered, identified as promising were the sub-aperture stitching and aspheric null for full-aperture testing. Testing with full-frame registration and spherical reference was rejected due to unresolved fringes.

Null mirrors may be used to back-reflect the aberrated wavefront, so that for the "proper" aberrations, the surface of the null reflector is coincident with the aberrated wavefront. The three major difficulties of this approach are fabrication, testing, and alignment. While fabrication of aspheric rotationally-symmetric nulls is possible with modern single-point diamond turning, their testing is a difficult task. The optical figure of the null reference needs to be guaranteed with accuracy higher than that of the conformal dome. Therefore, the task of testing the null is even more challenging than that of testing the dome itself. Finally, aspheric optics tends to be more sensitive to all types of misalignment, compared to conventional spherical optics, posing the alignment and stability problems in testing deep concave domes.

Holographic and digital holographic nulls pose significant application problems as well. Traditional film holograms may work in reflection or in transmission. Reflective holograms have to be thick for the mid-IR working wavelength, which makes fabrication difficult. In transmission (combined with a mirror), efficiency of a film hologram would be low, with two passes required. Both types are likely to suffer from stability issues. Digital holograms with dynamic control require liquid crystal (LC) spatial light modulators (SLM). The pixel pitch of such modulators is presently not sufficiently-fine for the large diffraction angles required in dome inspection. The feasible size of the LC SLM is typically smaller than required.

Static computer generated holograms (CGH) have the same issues as aspheric null mirrors: difficulty of testing and high sensitivity to misalignment.

Subaperture Stitching Interferometry (SSI) is a popular technique applicable to flat and spherical surfaces. With spherical surfaces, rotation of the optics under test around the center of the sphere provides for capturing multiple interferograms of the subapertures that are later stitched together to provide full aperture wavefront map. A perfect sphere would produce identical wavefront maps from each subaperture, which allows the stitching. Aspheric domes, however, would produce substantially different wavefront maps at different dome orientations. Moreover, the same portion of the dome at a different orientation would produce a different wavefront. For this reason, SSI is not readily applicable to metrology of aspheric domes.

Shack-Hartmann wavefront sensors have inherent limitations in the spatial resolution and in the resolution of wavefront measurement. They usually fall short of the resolution provided by interferometers.

In summary, no tools presently exist for optical metrology on deep concave domes. This invention presents a novel system and process for metrology on aspheric, conformal domes, associated corrector optics, and other highly aberrated optics. The invention is compatible with existing metrology tools and manufacturing processes already used in production of large spherical windows and domes.

SUMMARY OF THE INVENTION

Disclosed herein is an interferometry method and associated system and computerized media for testing samples under test including those with high aberrations, comprising: situating a sample under test between a tilt mirror and a reference mirror, the tilt mirror tiltable with at least one degree of freedom about at least one tilt mirror axis, and further translatable along an axial line defined by a direction of propagation of a test wavefront from a source thereof; propagating the test wavefront toward the tilt mirror; after the test wavefront has been reflected by the tilt mirror, further propagating the test wavefront toward a reference mirror; and deriving a substantially complete first-tilt-alignment wavefront metrology of the sample under test from a plurality of first-tilt-alignment interferograms taken with the tilt mirror held fixed at a first predetermined tilt mirror angle while discreetly varying a displacement between the sample under test and the reference mirror.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) summarized below.

DETAILED DESCRIPTION

Applicant's priority applications U.S. Ser. No. 12/472,362, U.S. Ser. No. 11/622,152, and U.S. 60/758,649, all incorporated by reference herein in their entirety, disclose a metrology tool for inspection of the optical figure on highly aberrated optics. The disclosure to follow presents further disclosure material which is novel and non-obvious over the prior art.

As noted in the priority applications, the preferred shape of the reference mirror is spherical. This allows for easier processing of the captured multiple fringe patterns and wavefront maps in surface reconstruction, with one point—center of curvature of the reference mirror—defining the reflected test wavefront. The distance of a ray from the mirror center defines the frequency of the fringes and the slope of the registered wavefront: the larger is this distance, the larger is the slope and the higher the frequency of the fringes.

At the same time, as has also been previously disclosed in these priority applications, other shapes of the reference mirror may be used in the invention, such as hyperbolic, parabolic, plane, toroidal, and others. The choice of the specific shape may depend on the dominant aberrations of the sample under test.

Shape of the Test Wavefront and Reference Mirror

As has been previously disclosed, this invention requires that a spherical wavefront emerge from a source of spherical wavefront (interferometer), followed by a sample under test, followed by a reference mirror. The spherical test wavefront may be either diverging or converging, and the reference mirror may be concave or convex, or have other shapes.

Figure 1A:
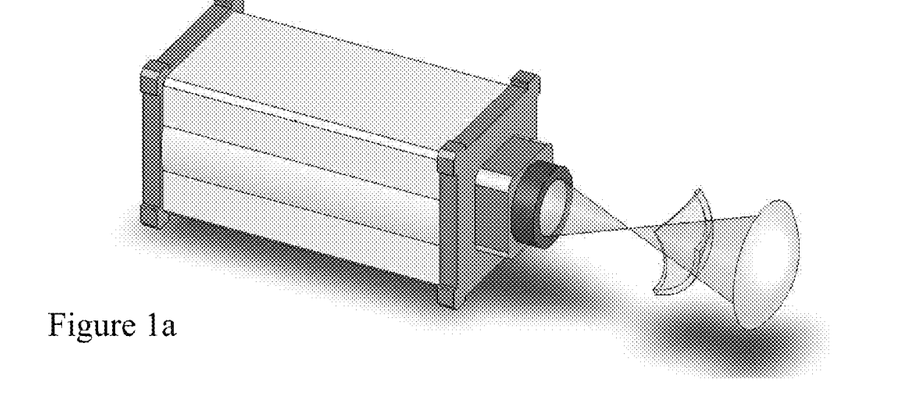
FIGS. 1 and 2 illustrates possible arrangements of the interferometer (source of spherical wavefront), sample under test, and the reference mirror.
Figure 2A:
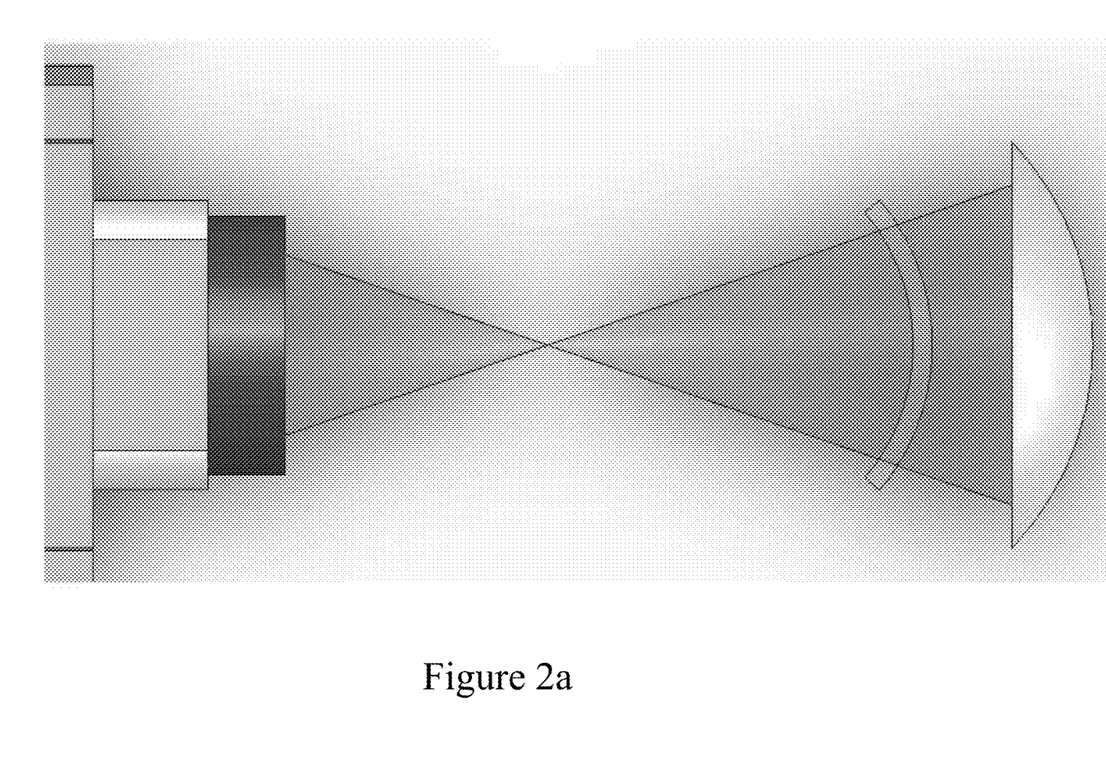

In the preferred embodiment, the sample is placed in a diverging test wavefront, e.g., past the focal spot of a converger-type transmission sphere of the interferometer as is illustrated by FIGS. 1*a* and 2*a*. In these illustrations, the reference mirror is concave, though this is intended to be exemplary, not limiting. The benefit of this preferred embodiment resides in its ability to measure large parts with the sizes exceeding the aperture of the interferometer, limited only by the size of the reference mirror.

Figure 1B:
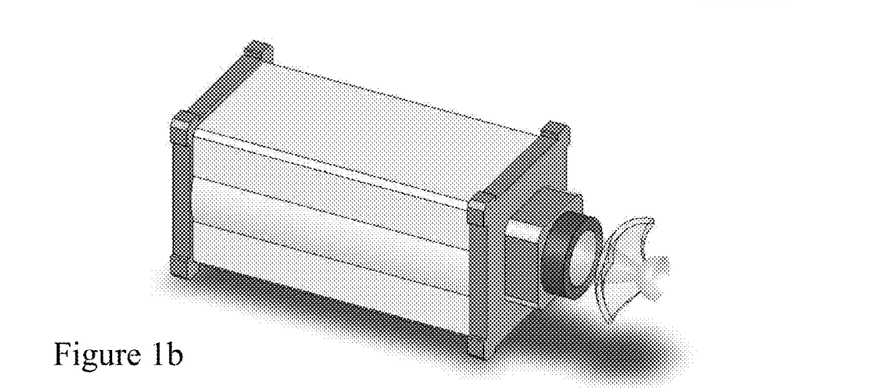
Figure 1C:
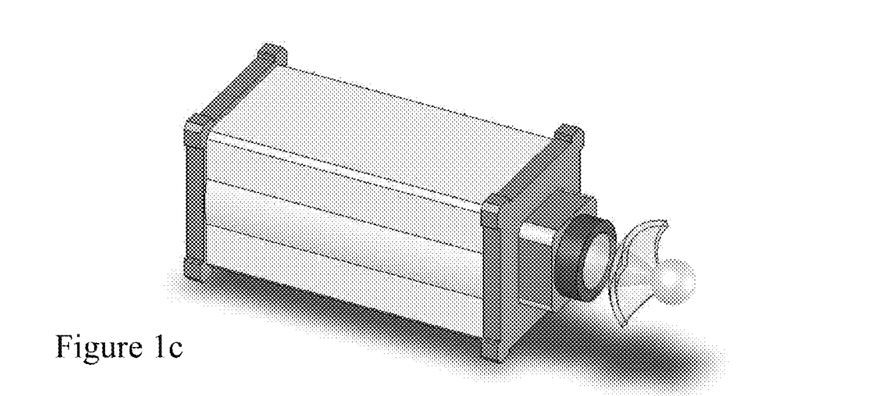
Figure 2B:
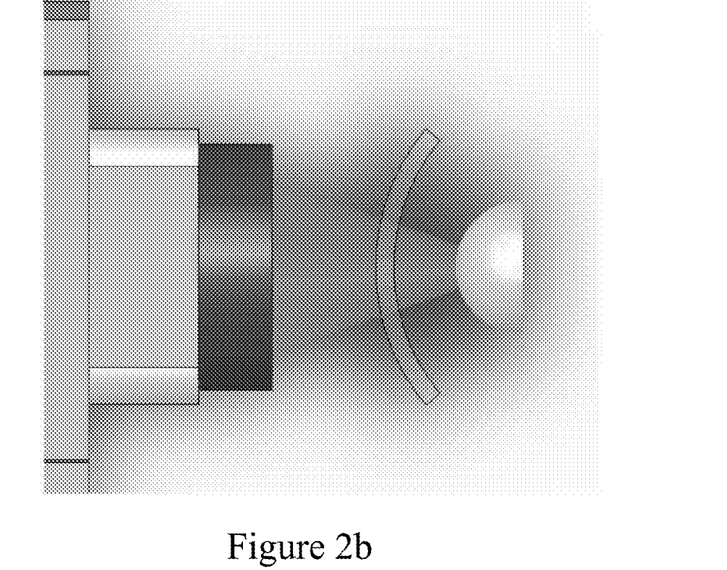
Figure 2C:
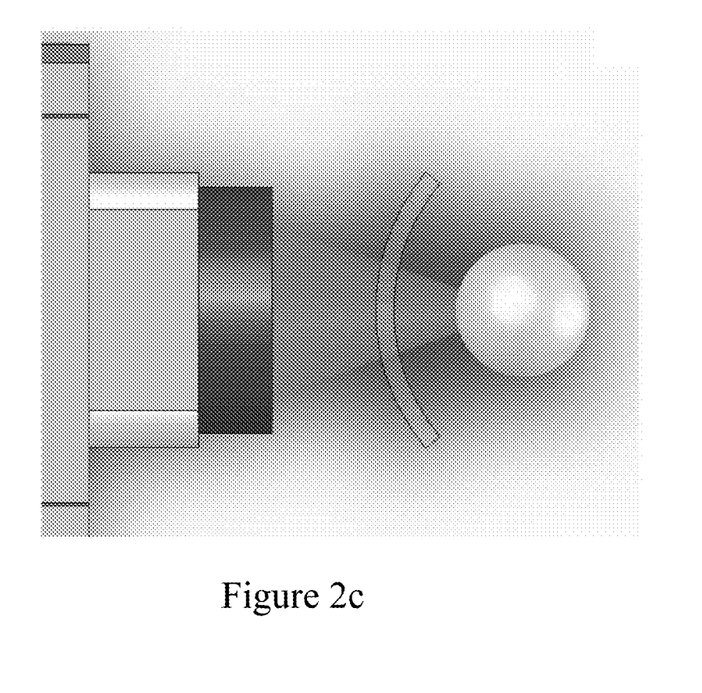

Alternatively, the sample may be placed in the optical path preceding the focal spot of the transmission sphere, in the converging test wavefront, as illustrated in FIGS. 1*b* and 2*b*. In this case, the reference mirror is convex. Furthermore, the convex reference mirror may be shaped as a complete sphere, as illustrated in FIGS. 1*c* and 2*c*. Multiple redundant wavefront maps may be captured at different random rotations of the complete reference sphere reflector and averaged, to remove the effect of errors on the shape of the reference sphere, similar to the "random ball" method known in the art. (see, e.g., R. E. Parks, C. Evans, L. Shao, Calibration of Interferometer Transmission Spheres. OSA, OF&T, Hawaii, 1999 or P. Zhou, J. H. Burge. Limits for Interferometer Calibration Using the Random Ball Test. SPIE 7426, 7426U-1, 2009).

Displacement and Tilt of the Reference Mirror

When the sample is rotationally symmetric and properly aligned so that its axis of symmetry is collinear with the optical axis of the interferometer, the transmitted wavefront is also rotationally symmetric around the optical axis. Each transmitted ray (vector normal to the wavefront intersecting the wavefront at a point) intersects with the optical axis. In this case, it is sufficient in principle to displace the reference mirror along the optical axis, so that the center of the reference mirror travels through each such point of ray-axis intersection, while the interferometer produces well-resolved fringes and wavefront maps for the respective portions of the test wavefront.

When the sample is not rotationally symmetric, the transmitted wavefront is not rotationally symmetric either, and most rays never intersect with the optical axis. In this case, the reference mirror needs to be tilted or moved in such a fashion that its center travels in the 3D space to closely approach each ray of the transmitted wavefront, to produce well-resolved fringes and wavefront maps that jointly cover the entire test wavefront.

Differences Between Displacements of the Sample and of the Reference Mirror

The sample distorts, i.e., introduces aberrations into, the transmitted wavefront. The portions of the distorted wavefront which are tangent or nearly-tangent to the reference mirror at the points of incidence (respective rays nearly-normal to the reference mirror) produce well-resolved fringes and wavefront maps—measurements of the wavefront. Two distinct operational modes are related to movements of the reference mirror and of the sample.

When the reference mirror moves and the sample does not move, different portions of the wavefront are measured at different times, jointly providing the overall wavefront map of the transmitted wavefront. Provided the sample remains in place in this process, the same static wavefront is measured. This mode of operation is preferred for wavefront metrology, or measurement of the transmitted wavefront.

When the sample also moves, it introduces different aberrations into the transmitted wavefront at different times. Multiple wavefront measurements at each of the different locations and/or orientations of the sample jointly provide information about the shape of its front and back surfaces. The measured aberrations at different orientations of the sample allow for separating the contributions of the two surfaces, directly related to the surface shapes. This operational mode, combined with the above-described measurements of each transmitted wavefront, is preferred for surface metrology, or measurement of the surface profile of the sample.

Alternative Embodiment

Figure 3:
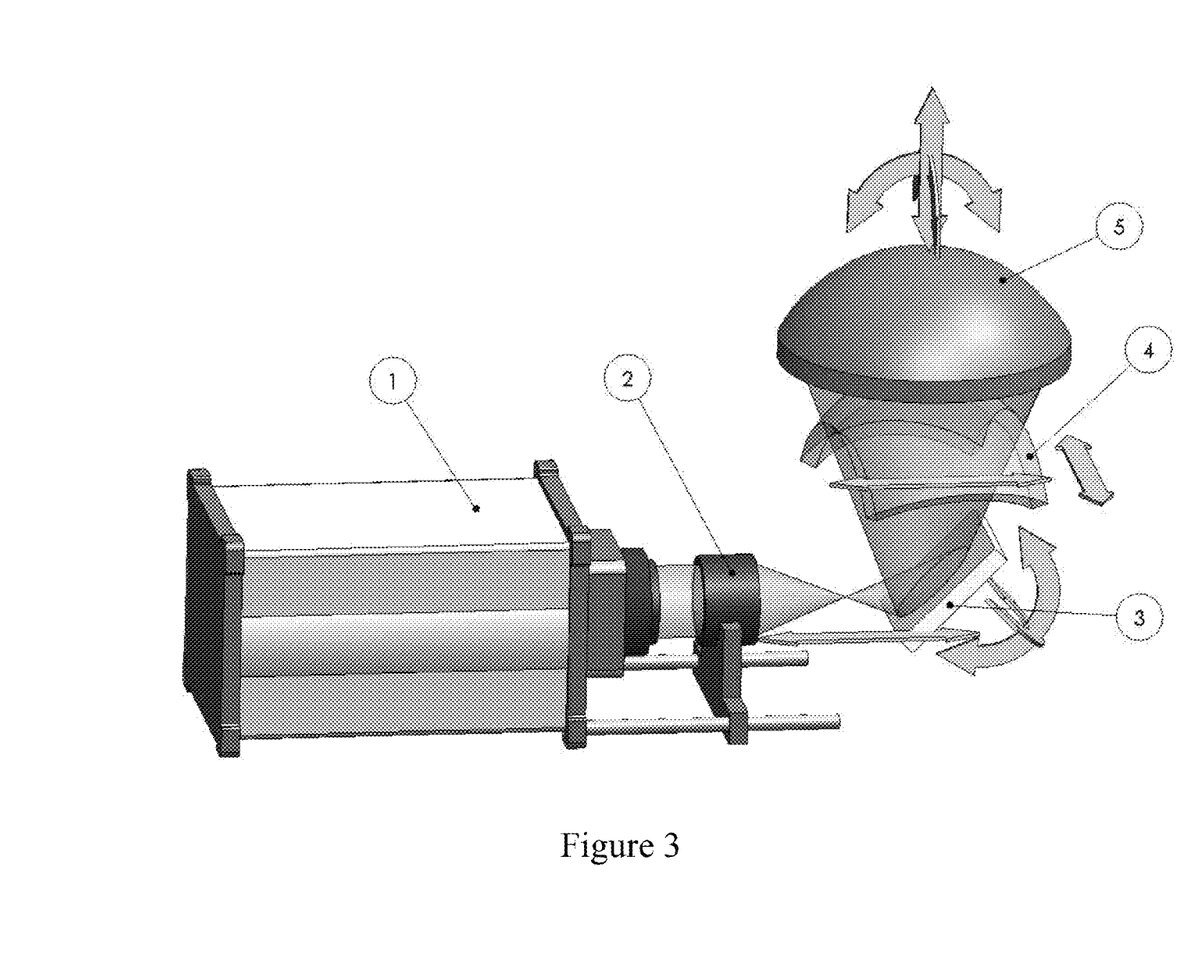
FIG. 3 shows an alternative embodiment of this invention with a tilt mirror

An alternative embodiment of the wavefront and surface metrology according to this invention is now illustrated shown in FIG. 3.

The improvement of this alternative embodiment is in the introduction of a tilt mirror 3 between the transmission sphere 2 of the interferometer 1 and reference mirror 5. This tilt mirror has at least one degree of freedom, i.e., is tiltable about at least one tilt mirror axis, and preferably has two degrees of freedom, i.e., is free to tilt about two tilt mirror axes. A collimated beam from the standard interferometer 1 is transformed into a spherical wavefront by the standard transmission sphere lens 2 and reflected by the tilt mirror 3. The tilt mirror 3 is preferably placed closer to the focal spot of the transmission sphere than the sample under test, thus the size (cross-sectional area) of the tilt mirror can be smaller than that of the window under test. The tilt mirror may be placed in the test beam either before or after the focal spot of the transmission sphere, see the earlier discussed contrast between FIGS. 1a, 2a, and FIGS. 1b, 2b. The tilt mirror provides for controlled change in the angle at which the test rays pass through the sample. The tilt of the tilt mirror and/or lateral displacements of the sample effectively eliminate the need in tilting the sample in surface metrology. This facilitates the measurement of large and heavy samples. In addition, the tilt mirror folds the optical path, so that the window under test is horizontal in the setup, which allows for better mechanical arrangement against gravity forces, allowing easy handling of large weight samples. The reference mirror 5 is movable along, and is tiltable relative to, the direction of light propagation, as illustrated. It may also be moved in a non-axial displacement relative to the sample under test.

Figure 4A:
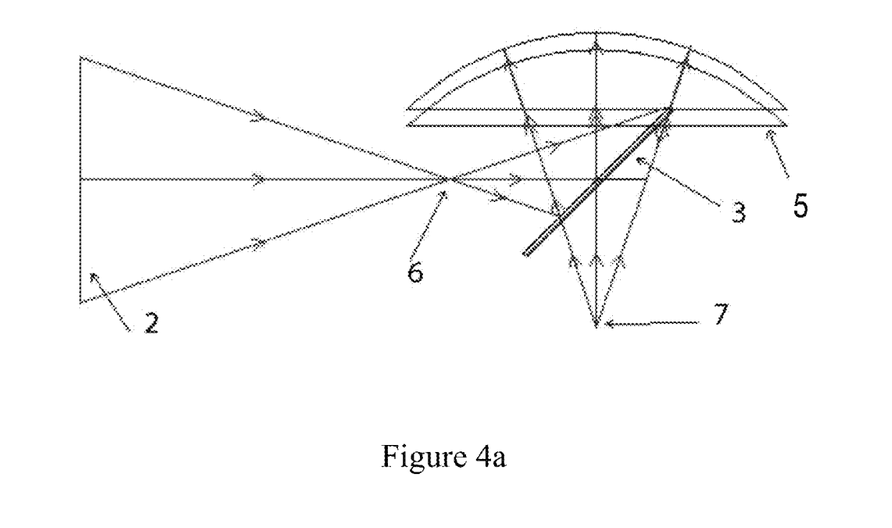
FIG. 4 illustrates operation of the tilt mirror for controlling location of the image of the focal spot of the transmission sphere
Figure 4B:
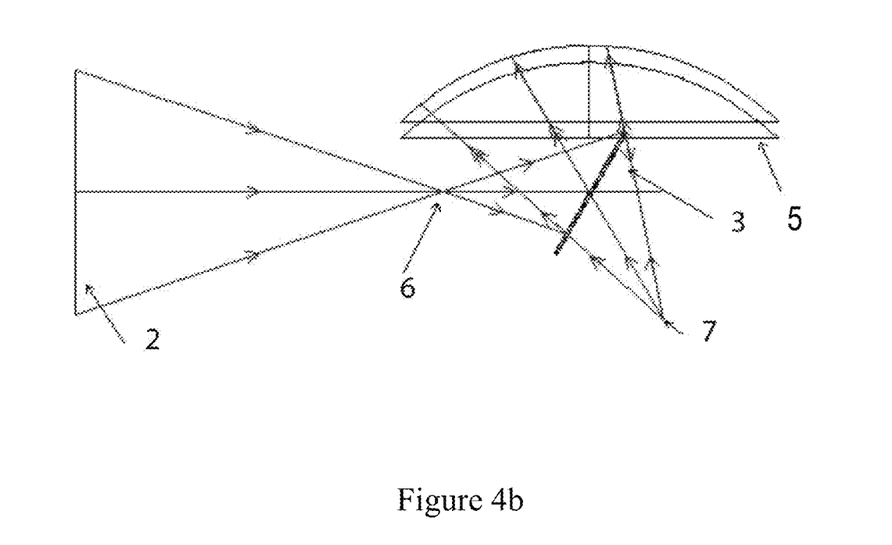
Figure 4C:
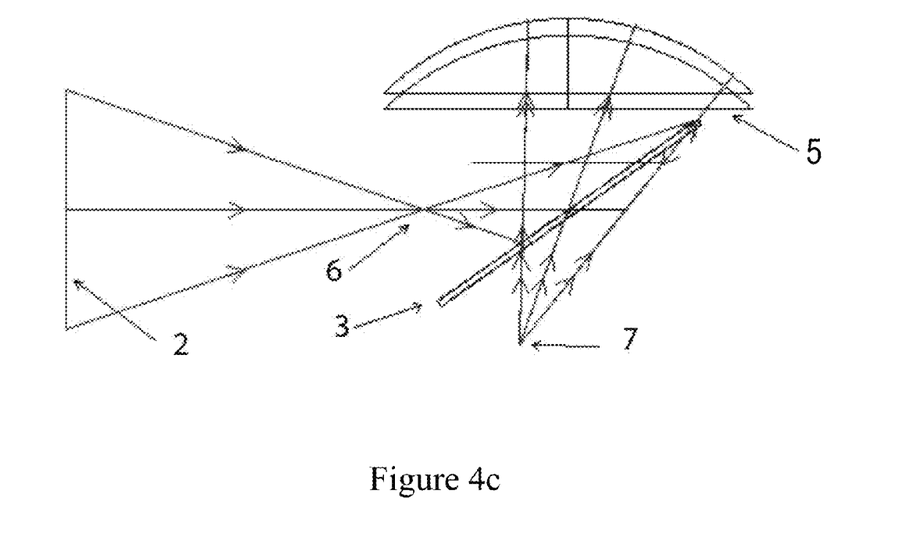
Figure 4D:
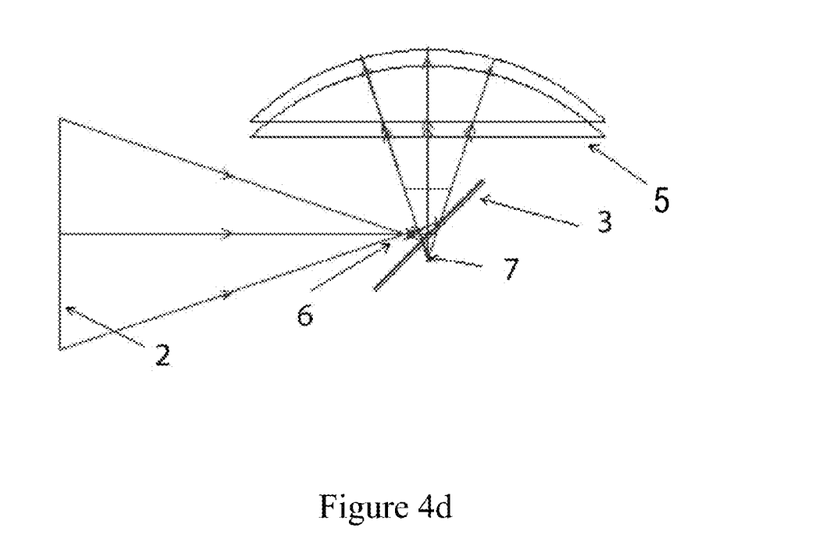
Figure 4E:
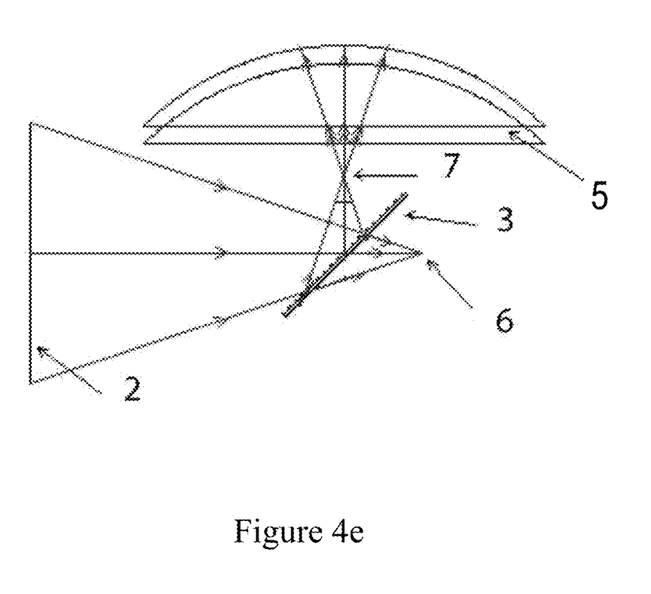

The tilt mirror 3 provides for control over the image of the focal spot of the transmission sphere, as viewed from the sample. FIGS. 4a through 4e illustrate this control. Shown schematically in these FIGS. 4a through 4e are transmission sphere 2, its focal spot 6, tilt mirror 3, and image of the focal spot of the transmission sphere 7. FIGS. 4a through 4c show how rotation of the tilt mirror controls the rotation of the image of the focal spot around the axis of rotation. FIG. 4d illustrates how axial displacement of the tilt mirror (in this example, toward transmission sphere) controls the radius of this rotation of the focal spot. FIGS. 4a through 4d illustrate that when the distance from the transmission sphere to the tilt mirror is longer than the focal length of the transmission sphere, the image of the focal spot is virtual and placed below the tilt mirror. FIG. 4e illustrates that when the distance from the transmission sphere to the tilt mirror is shorter than the focal length of the transmission sphere, the image of the focal spot is real and placed above the tilt mirror.

In effect, this control over the location of the image of the focal spot of the transmission sphere is symmetrical to the control over the location of the center of the reference mirror, which can be described as follows. When positions of the focal spot and the sample are fixed, the rays that emerged from the focal spot, after passing through the sample, no longer have a common point of intersection, but the reference mirror can be moved to bring its center near each ray (null position), one ray at a time, to produce the synthetic transmitted wavefront as propagated from the interferometer towards the reference mirror. On the other hand, near null, rays are close to normal to the reference mirror and close to coincident with its center of curvature. One can think of the reflected wavefront near null as a set of rays emitted by the reference mirror normal to its surface, and directed closely to having a common point of intersection at the center of curvature of the reference mirror. As these trays pass through the sample towards the interferometer, they experience refraction by the sample, aberrations, and no longer are close to having a common point of intersection. Still, the tilt mirror can be moved to bring the image of the focal spot of the transmission sphere near each ray (null position), one ray at a time, to produce the synthetic transmitted wavefront as propagated from the reference mirror towards interferometer.

The system operates as follows. The test wavefront is transmitted through the sample 4 being tested. Refraction in the sample under test changes the wavefront, introducing aberrations. The aberrated wavefront is reflected by the (preferably spherical) reference mirror 5, travels back through the sample under test, and is re-collimated by the transmission sphere into an "aberrated-plane" wavefront, which re-enters the interferometer where it is mixed on the imaging sensor with a reference plane wavefront. The wavefronts may be phase-shifted if the standard interferometer operates in the Phase-Shifting Interferometry (PSI) mode. The resulting fringe patterns are captured by the imaging sensor as in conventional interferometry, followed by reconstruction of the phase map using the standard software of the interferometer. Multiple phase maps are captured at different displacements of the reference spherical mirror 5 and/or translations of the sample 4 and rotations and translations of the tilt mirror 3. The series of captured phase maps are processed in dedicated software. The output of the processing is one or more surface optical figures of both surfaces of the sample.

In addition, the tilt mirror adds additional degrees of freedom in the system, providing additional possible "scenarios" of the measurement, as further described below.

Wavefront Synthesis

This invention provides for both wavefront and surface metrology. At each location/orientation of the sample, a multitude of wavefront maps are captured, each at a different position and/or orientation of the reference mirror and/or the tilt mirror. Each of the wavefront maps provides the measured phase over a limited portion of the overall wavefront. Jointly, the multitude of the wavefront maps provide the shape of the wavefront for a given location and orientation of the sample.

This process is different from the subaperture stitching interferometry disclosed in QED U.S. Pat. No. 6,956,657, in which multiple wavefront (surface) maps are stitched while reducing uncalibrated error by stitching said measurements together, where low spatial frequency information in said measurements is explicitly filtered out or compensated implicitly with free compensators. The measurement further involves measuring the same location of a test part, but with different slope distributions (achieved, for example, by slightly tilting the test part), allowing such slope-dependent errors to be reduced with averaging along with the usual spatially dependent reference wave biases.

The QED subaperture surface measurements are independent of each other prior to stitching. The change in the absolute phase or height (since the QED metrology is surface metrology measuring direct reflection from one surface of the sample) between individual measurements is lost, and only restored during stitching by numerically minimizing the stitching error.

This invention produces an overall phase map from multiple partial phase maps in a different fashion. As the reference mirror moves from one wavefront measurement position to the next, the system continuously keeps track of the phase at each pixel. This is achieved by a combination of two functions: 1) "fringe counting", i.e., keeping track of the variations of the intensity at each pixel of the real-time intensity map produced by the interferometer, to produce "whole wave count", and 2) adding the fractional phase from acquired phase maps at each position of the reference mirror, to account for the "fractional waves." As a result, the phase at every pixel of the synthesized phase map is known relative to a first pixel, the overall wavefront is synthesized with interferometric accuracy, and no accumulation of error takes place as the number of wavefront maps increases, each captured over a limited portion of the overall wavefront.

The knowledge possessed by someone of ordinary skill in the art at the time of this disclosure is understood to be part and parcel of this disclosure and is implicitly incorporated by reference herein, even if in the interest of economy express statements about the specific knowledge understood to be possessed by someone of ordinary skill are omitted from this disclosure. While reference may be made in this disclosure to the invention comprising a combination of a plurality of elements, it is also understood that this invention is regarded to comprise combinations which omit or exclude one or more of such elements, even if this omission or exclusion of an element or elements is not expressly stated herein, unless it is expressly stated herein that an element is essential to applicant's combination and cannot be omitted. It is further understood that the related prior art may include elements from which this invention may be distinguished by negative claim limitations, even without any express statement of such negative limitations herein. It is to be understood, between the positive statements of applicant's invention expressly stated herein, and the prior art and knowledge of the prior art by those of ordinary skill which is incorporated herein even if not expressly reproduced here for reasons of economy, that any and all such negative claim limitations supported by the prior art are also considered to be within the scope of this disclosure and its associated claims, even absent any express statement herein about any particular negative claim limitations.

Finally, while only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

We claim:

1. An interferometry system for testing samples under test including those with high aberrations, comprising:
    a source of a test wavefront, whereby an axial line is defined by a direction of propagation of the test wavefront from said source;
    a tilt mirror tiltable with at least one degree of freedom about at least one tilt mirror axis and translatable along said axial line, situated in a path of the test wavefront propagation from said source;
    a reference mirror situated in a path of propagation of the test wavefront after the test wavefront has been reflected by said tilt mirror;
    a computerized control system and mechanical apparatus responsive thereto for controlling an axial displacement between a sample under test and said reference mirror, with the sample under test situated between said tilt mirror and said reference mirror;
    said computerized control system and mechanical apparatus responsive thereto for further controlling a tilt mirror angle of said tilt mirror about said at least one tilt mirror axis and a translation of said tilt mirror along said axial line; and
    a computerized device including a processor for deriving a substantially complete first-tilt-alignment wavefront metrology of the sample under test from a plurality of first-tilt-alignment interferograms, wherein, responsive to said computerized control system:
    said plurality of first-tilt-alignment interferograms is obtained with said tilt mirror oriented at a first predetermined tilt mirror angle relative to said propagation of the test wavefront; and
    each of said first-tilt-alignment interferograms is obtained, with said first predetermined tilt mirror angle held fixed, by said mechanical apparatus discretely varying said displacement between the sample under test and said reference mirror.

2. The system of claim 1, wherein said first predetermined tilt mirror angle is approximately equal to forty-five degrees (45°) relative to said axial line.

3. The system of claim 1, further comprising:
    said computerized device for deriving a substantially complete second-tilt-alignment wavefront metrology of the sample under test from a plurality of second-tilt-alignment interferograms, and further, for deriving a substantially complete surface metrology of the sample under test using said first-tilt-alignment wavefront metrology in combination with said second-tilt-alignment wavefront metrology; wherein, responsive to said computerized control system:
    said plurality of second-tilt-alignment interferograms is obtained with said tilt mirror tilted at a second predetermined tilt mirror angle relative to said propagation of the test wavefront; and
    each of said second-tilt-alignment interferograms is obtained, with said second predetermined tilt mirror angle held fixed, by said mechanical apparatus discretely varying said displacement between the sample under test and said reference mirror.

4. The system of claim 3, wherein said first predetermined tilt mirror angle is approximately equal to forty-five degrees (45°) relative to said axial line.

5. The system of claim 3, said computerized device for deriving said substantially complete surface metrology further comprising processing capability for:
- calculating a difference between said first-tilt-alignment wavefront metrology and said second-tilt-alignment wavefront metrology;
- deducing therefrom a surface gradient of the sample under test; and
- integrating said surface gradient.

6. The system of claim 1, further comprising:
said computerized device for deriving said first-tilt-alignment wavefront metrology complementing under-sampled portions of one first-tilt-alignment interferogram with high-resolution corresponding portions of another first-tilt-alignment interferogram for a given corresponding portion of the sample under test.

7. The system of claim 3, further comprising:
said computerized device for deriving said first-tilt-alignment wavefront metrology complementing under-sampled portions of one first-tilt-alignment interferogram with high-resolution corresponding portions of another first-tilt-alignment interferogram for a given corresponding portion of the sample under test; and
said computerized device for deriving said second-tilt-alignment wavefront metrology complementing under-sampled portions of one second-tilt-alignment interferogram with high-resolution corresponding portions of another second-tilt-alignment interferogram for a given corresponding portion of the sample under test.

8. The system of claim 1, further comprising:
said computerized device for deriving said first-tilt-alignment wavefront metrology by subtracting any deviations of said reference mirror from a perfect sphere, as determined by self-testing said reference mirror without situating the sample under test between said tilt mirror and said reference mirror.

9. The system of claim 3, further comprising:
said computerized device for deriving said first- and second-tilt-alignment wavefront metrologies by subtracting any deviations of said reference mirror from a perfect sphere, as determined by self-testing said reference mirror without situating the sample under test between said tilt mirror and said reference mirror.

10. The system of claim 1, wherein a shape of said reference mirror is spherical.

11. The system of claim 1, wherein a shape of said reference mirror is selected from the reference mirror shape group consisting of: parabolic; hyperbolic; elliptical; plane; polynomial; spline; and an aspheric shape.

12. The system of claim 1, wherein:
said system is configured such that the sample under test is situated where said test wavefront is diverging; and
said reference mirror is concave relative to the test wavefront.

13. The system of claim 1, wherein:
said system is configured such that the sample under test is situated where said test wavefront is converging; and
said reference mirror is convex relative to the test wavefront.

14. The system of claim 1, said computerized control system and mechanical apparatus responsive thereto for further controlling a tilt angle of said reference mirror relative to the sample under test.

15. The system of claim 1, said computerized control system and mechanical apparatus responsive thereto for further controlling a non-axial displacement of said reference mirror relative to the sample under test.

16. The system of claim 1, said computerized device for deriving said substantially complete surface metrology further comprising processing capability for producing an overall phase map from multiple partial phase maps by continuously tracking a phase at each pixel by:
- fringe counting, i.e., tracking variations of intensity at each pixel of a real-time intensity map produced by the interferometer to produce a whole wave count; and
- adding a fractional phase from acquired phase maps at each position and/or orientation of sais reference mirror, thereby accounting for fractional waves, whereby:
- the phase at every pixel of a synthesized phase map is known relative to a first pixel, the overall wavefront is synthesized with interferometric accuracy, and no accumulation of error takes place as the number of wavefront maps increases, each captured over a limited portion of the overall wavefront.

17. An interferometry system for testing samples under test including those with high aberrations, comprising:
- a source of a test wavefront, whereby an axial line is defined by a direction of propagation of the test wavefront;
- a reference mirror;
- a computerized control system and mechanical apparatus responsive thereto for controlling a displacement between an sample under test and said reference mirror, with the sample under test situated between said source and said reference mirror;
- a computerized device including a processor for deriving a substantially complete first-tilt-alignment wavefront metrology of the sample under test from a plurality of first-tilt-alignment interferograms; and
- said computerized device for further producing an overall phase map from multiple partial phase maps by continuously tracking a phase at each pixel by:
  - fringe counting, i.e., tracking variations of intensity at each pixel of a real-time intensity map produced by the interferometer to produce a whole wave count; and
  - adding a fractional phase from acquired phase maps at each position and/or orientation of sais reference mirror, thereby accounting for fractional waves;
- wherein, responsive to said computerized control system:
- said plurality of first-tilt-alignment interferograms is obtained with the sample under test oriented at a first predetermined tilt angle relative to said propagation of the test wavefront; and
- each of said first-tilt-alignment interferograms is obtained, with said first predetermined tilt angle held fixed, by said mechanical apparatus discretely varying said displacement between the sample under test and said reference mirror.

18. The system of claim 17, wherein:
said system is configured such that the sample under test is situated where said test wavefront is diverging; and
said reference mirror is concave relative to the test wavefront.

19. The system of claim 17, wherein:
said system is configured such that the sample under test is situated where said test wavefront is converging; and
said reference mirror is convex relative to the test wavefront.

20. The system of claim 17, said computerized control system and mechanical apparatus responsive thereto for further changing a tilt angle of said reference mirror relative to the sample under test.

21. The system of claim 17, said computerized control system and mechanical apparatus responsive thereto for further changing a non-axial displacement of said reference mirror relative to the sample under test.

22. An interferometry method for testing samples under test including those with high aberrations, comprising:
situating a sample under test between a tilt mirror and a reference mirror, said tilt mirror tiltable with at least one degree of freedom about at least one tilt mirror axis, and further translatable along an axial line defined by a direction of propagation of a test wavefront from a source thereof;
propagating the test wavefront toward said tilt mirror;
after the test wavefront has been reflected by said tilt mirror, further propagating the test wavefront toward a reference mirror; and
deriving a substantially complete first-tilt-alignment wavefront metrology of the sample under test from a plurality of first-tilt-alignment interferograms taken with said tilt mirror held fixed at a first predetermined tilt mirror angle while discreetly varying a displacement between the sample under test and said reference mirror.

23. The method of claim 22, further comprising setting said first predetermined tilt mirror angle to be approximately equal to forty-five degrees (45°) relative to said axial line.

24. The method of claim 22, further comprising:
deriving a substantially complete second-tilt-alignment wavefront metrology of the sample under test from a plurality of second-tilt-alignment interferograms taken with said tilt mirror held fixed at a second predetermined tilt mirror angle while discreetly varying a displacement between the sample under test and said reference mirror; and
deriving a substantially complete surface metrology of the sample under test using said first-tilt-alignment wavefront metrology in combination with said second-tilt-alignment wavefront metrology.

25. The method of claim 24, further comprising setting said first predetermined tilt mirror angle to be approximately equal to forty-five degrees (45°) relative to said axial line.

26. The method of claim 24, said deriving said substantially complete surface metrology further comprising:
calculating a difference between said first-tilt-alignment wavefront metrology and said second-tilt-alignment wavefront metrology;
deducing therefrom a surface gradient of the sample under test; and
integrating said surface gradient.

27. The method of claim 22, further comprising deriving said first-tilt-alignment wavefront metrology by:
complementing under-sampled portions of one first-tilt-alignment interferogram with high-resolution corresponding portions of another first-tilt-alignment interferogram for a given corresponding portion of the sample under test.

28. The method of claim 24, further comprising:
said first-tilt-alignment wavefront metrology complementing under-sampled portions of one first-tilt-alignment interferogram with high-resolution corresponding portions of another first-tilt-alignment interferogram for a given corresponding portion of the sample under test; and
deriving said second-tilt-alignment wavefront metrology complementing under-sampled portions of one second-tilt-alignment interferogram with high-resolution corresponding portions of another second-tilt-alignment interferogram for a given corresponding portion of the sample under test.

29. The method of claim 22, further comprising deriving said first-tilt-alignment wavefront metrology by:
determining any deviations from a perfect sphere in a shape of said reference mirror by self-testing said reference mirror without situating sample under test between said tilt mirror and said reference mirror; and
subtracting any said deviations.

30. The method of claim 24, further comprising deriving said first- and second-tilt-alignment wavefront metrologies by:
determining any deviations from a perfect sphere in a shape of said reference mirror by self-testing said reference mirror without situating the sample under test between said tilt mirror and said reference mirror; and
subtracting any said deviations.

31. The method of claim 22 wherein a shape of said reference mirror is spherical.

32. The method of claim 22, wherein a shape of said reference mirror is selected from the reference mirror shape group consisting of: parabolic; hyperbolic; elliptical; plane; polynomial; spline; and an aspheric shape.

33. The method of claim 22, wherein:
the sample under test is situated where said test wavefront is diverging; and
said reference mirror is concave relative to the test wavefront.

34. The method of claim 22, wherein:
the sample under test is situated where said test wavefront is converging; and
said reference mirror is convex relative to the test wavefront.

35. The method of claim 22, further comprising changing a tilt angle of said reference mirror relative to the sample under test.

36. The method of claim 22, further comprising changing a non-axial displacement of said reference mirror relative to the sample under test.

37. The method of claim 22, said deriving said substantially complete surface metrology further comprising producing an overall phase map from multiple partial phase maps by continuously tracking a phase at each pixel by:
fringe counting, i.e., tracking variations of intensity at each pixel of a real-time intensity map produced by the interferometer to produce a whole wave count; and
adding a fractional phase from acquired phase maps at each position and/or orientation of sais reference mirror, thereby accounting for fractional waves, whereby:
the phase at every pixel of a synthesized phase map is known relative to a first pixel, the overall wavefront is synthesized with interferometric accuracy, and no accumulation of error takes place as the number of wavefront maps increases, each captured over a limited portion of the overall wavefront.

38. An interferometry method for testing samples under test including those with high aberrations, comprising:
situating a sample under test between a source of a test wavefront and a reference mirror;
propagating a test wavefront, whereby an axial line is defined by a direction of propagation of the test wavefront;

deriving a substantially complete first-tilt-alignment wavefront metrology of the sample under test from a plurality of first-tilt-alignment interferograms obtained with the sample under test held fixed at a first predetermined tilt angle relative to a direction of propagation of the test wavefront while discreetly varying a displacement between the sample under test and said reference mirror; and deriving said substantially complete surface metrology by further producing an overall phase map from multiple partial phase maps by continuously tracking a phase at each pixel by: fringe counting, i.e., tracking variations of intensity at each pixel of a real-time intensity map produced by the interferometer to produce a whole wave count; and adding a fractional phase from acquired phase maps at each position and/or orientation of sais reference mirror, thereby accounting for fractional waves.

39. The method of claim 38, wherein:
the sample under test is situated where said test wavefront is diverging; and
said reference mirror is concave relative to the test wavefront.

40. The method of claim 38, wherein:
the sample under test is situated where said test wavefront is converging; and
said reference mirror is convex relative to the test wavefront.

41. The method of claim 38, further comprising changing a tilt angle of said reference mirror relative to the sample under test.

42. The method of claim 38, further comprising changing a non-axial displacement of said reference mirror relative to the sample under test.

43. Non-transitory computerized media for operating a computerized device, for use in connection with a interferometry method for testing a sample under test including those with high aberrations, comprising computer instructions for:
deriving a substantially complete first-tilt-alignment wavefront metrology of the sample under test from a plurality of first-tilt-alignment interferograms taken with a tilt mirror held fixed at a first predetermined tilt mirror angle while discreetly varying a displacement between the sample under test and a reference mirror, via a mechanical apparatus responsive to said computer instructions; wherein:
the sample under test is situated between said tilt mirror and said reference mirror, with said tilt mirror tiltable with at least one degree of freedom about at least one tilt mirror axis and further translatable along an axial line defined by a direction of propagation of a test wavefront from a source thereof;
the test wavefront is propagated toward said tilt mirror;
after the test wavefront has been reflected by said tilt mirror, the test wavefront is further propagated toward said reference mirror.

44. The computerized media of claim 43, further comprising computer instructions, via said mechanical apparatus, for setting said first predetermined tilt mirror angle to be approximately equal to forty-five degrees (45°) relative to said axial line.

45. The computerized media of claim 43, further comprising computer instructions for:
deriving a substantially complete second-tilt-alignment wavefront metrology of the sample under test from a plurality of second-tilt-alignment interferograms taken with said tilt mirror held fixed at a second predetermined tilt mirror angle while discreetly varying a displacement between the sample under test and said reference mirror, via said mechanical apparatus; and
deriving a substantially complete surface metrology of the sample under test using said first-tilt-alignment wavefront metrology in combination with said second-tilt-alignment wavefront metrology.

46. The computerized media of claim 45, further comprising computer instructions, via said mechanical apparatus, for setting said first predetermined tilt mirror angle to be approximately equal to forty-five degrees (45°) relative to said axial line.

47. The computerized media of claim 45, said computer instructions for said deriving said substantially complete surface metrology further comprising computer instructions for:
calculating a difference between said first-tilt-alignment wavefront metrology and said second-tilt-alignment wavefront metrology;
deducing therefrom a surface gradient of the sample under test; and
integrating said surface gradient.

48. The computerized media of claim 43, said computer instructions for deriving said first-tilt-alignment wavefront metrology further comprising computer instructions for:
complementing under-sampled portions of one first-tilt-alignment interferogram with high-resolution corresponding portions of another first-tilt-alignment interferogram for a given corresponding portion of the sample under test.

49. The computerized media of claim 45, further comprising:
said computer instructions for deriving said first-tilt-alignment wavefront metrology further comprising computer instructions for complementing under-sampled portions of one first-tilt-alignment interferogram with high-resolution corresponding portions of another first-tilt-alignment interferogram for a given corresponding portion of the sample under test; and
said computer instructions for deriving said second-tilt-alignment wavefront metrology further comprising computer instructions for complementing under-sampled portions of one second-tilt-alignment interferogram with high-resolution corresponding portions of another second-tilt-alignment interferogram for a given corresponding portion of the sample under test.

50. The computerized media of claim 43, said computer instructions for deriving said first-tilt-alignment wavefront metrology further comprising computer instructions for:
determining any deviations from a perfect sphere in a shape of said reference mirror by self-testing said reference mirror without situating sample under test between said tilt mirror and said reference mirror; and
subtracting any said deviations.

51. The computerized media of claim 45, said computer instructions for deriving said first- and second-tilt-alignment wavefront metrologies further comprising computer instructions for:
determining any deviations from a perfect sphere in a shape of said reference mirror by self-testing said reference mirror without situating the sample under test between said tilt mirror and said reference mirror; and
subtracting any said deviations.

52. The computerized media of claim 43 wherein a shape of said reference mirror is spherical.

53. The computerized media of claim 43, wherein a shape of said reference mirror is selected from the reference mirror shape group consisting of: parabolic; hyperbolic; elliptical; plane; polynomial; spline; and an aspheric shape.

54. The computerized media of claim 43, wherein:
the sample under test is situated where said test wavefront is diverging; and
said reference mirror is concave relative to the test wavefront.

55. The computerized media of claim 43, wherein:
the sample under test is situated where said test wavefront is converging; and
said reference mirror is convex relative to the test wavefront.

56. The computerized media of claim 43, further comprising computer instructions, via said mechanical apparatus, for changing a tilt angle of said reference mirror relative to the sample under test.

57. The computerized media of claim 43, further comprising computer instructions, via said mechanical apparatus, for changing a non-axial displacement of said reference mirror relative to the sample under test.

58. The computerized media of claim 43, said computer instructions for deriving said substantially complete surface metrology further comprising computer instructions for producing an overall phase map from multiple partial phase maps by continuously tracking a phase at each pixel by:
fringe counting, i.e., tracking variations of intensity at each pixel of a real-time intensity map produced by the interferometer to produce a whole wave count; and
adding a fractional phase from acquired phase maps at each position and/or orientation of sais reference mirror, thereby accounting for fractional waves, whereby:
the phase at every pixel of a synthesized phase map is known relative to a first pixel, the overall wavefront is synthesized with interferometric accuracy, and no accumulation of error takes place as the number of wavefront maps increases, each captured over a limited portion of the overall wavefront.

59. Computerized media for operating a computerized device, for use in connection with a interferometry method for testing a sample under test including those with high aberrations, comprising computer instructions for:
deriving a substantially complete first-tilt-alignment wavefront metrology of the sample under test from a plurality of first-tilt-alignment interferograms obtained with the sample under test held fixed at a first predetermined tilt angle relative to a direction of propagation of the test wavefront while discreetly varying a displacement between the sample under test and said reference mirror, via a mechanical apparatus responsive to said computer instructions; and
deriving said substantially complete surface metrology by further producing an overall phase map from multiple partial phase maps by continuously tracking a phase at each pixel by: fringe counting, i.e., tracking variations of intensity at each pixel of a real-time intensity map produced by the interferometer to produce a whole wave count; and adding a fractional phase from acquired phase maps at each position and/or orientation of sais reference mirror, thereby accounting for fractional waves; wherein:
the sample under test is situated between a source of a test wavefront and a reference mirror;
the test wavefront is propagated, whereby an axial line is defined by a direction of propagation of said test wavefront.

60. The computerized media of claim 59, wherein:
the sample under test is situated where said test wavefront is diverging; and
said reference mirror is concave relative to the test wavefront.

61. The computerized media of claim 59, wherein:
the sample under test is situated where said test wavefront is converging; and
said reference mirror is convex relative to the test wavefront.

62. The computerized media of claim 59, further comprising computer instructions, via said mechanical apparatus, for changing a tilt angle of said reference mirror relative to the sample under test.

63. The computerized media of claim 59, further comprising computer instructions, via said mechanical apparatus, for changing a non-axial displacement of said reference mirror relative to the sample under test.

* * * * *